(12) United States Patent
Glade

(10) Patent No.: US 6,643,290 B1
(45) Date of Patent: Nov. 4, 2003

(54) METHOD FOR CONTROLLING ACCESSES TO RESOURCES OF A COMMUNICATION NETWORK

(75) Inventor: Martin Glade, Bonn (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/240,276

(22) Filed: Jan. 29, 1999

(30) Foreign Application Priority Data

Jan. 30, 1998 (DE) ......................................... 198 03 758

(51) Int. Cl.[7] .............................. H04B 7/212; H04J 3/16
(52) U.S. Cl. ..................... 370/395.4; 370/468; 370/230
(58) Field of Search ........................... 370/395.1, 395.2, 370/395.21, 395.4, 395.41, 395.42, 395.43, 230, 235, 465, 468, 442, 444, 458, 412, 466; 709/104

(56) References Cited

U.S. PATENT DOCUMENTS

| | | | |
|---|---|---|---|
| 4,914,650 A | | 4/1990 | Sriram |
| 5,392,280 A | | 2/1995 | Zheng |
| 5,533,020 A | * | 7/1996 | Byrn et al. ............... 370/395.4 |
| 5,570,355 A | * | 10/1996 | Dail et al. .................... 370/442 |
| 5,577,035 A | * | 11/1996 | Hayter et al. ............ 370/395.4 |
| 5,615,036 A | * | 3/1997 | Emura ........................ 359/118 |
| 5,638,371 A | | 6/1997 | Raychaudhuri et al. |
| 5,677,906 A | * | 10/1997 | Hayter et al. ................ 370/235 |
| 5,684,791 A | | 11/1997 | Raychaudhuri et al. |
| 5,745,694 A | * | 4/1998 | Egawa et al. ................ 709/104 |
| 5,754,529 A | * | 5/1998 | Heiss ..................... 370/395.43 |
| 5,917,822 A | * | 6/1999 | Lyles et al. ............... 370/395.4 |
| 5,936,958 A | * | 8/1999 | Soumiya et al. ........ 370/395.43 |
| 5,987,031 A | * | 11/1999 | Miller et al. ............ 370/395.43 |
| 6,046,981 A | * | 4/2000 | Ramamurthy et al. ....... 370/468 |
| 6,064,674 A | * | 5/2000 | Doidge et al. ............... 370/466 |
| 6,125,118 A | * | 9/2000 | Arnold ........................ 370/401 |
| 6,226,263 B1 | * | 5/2001 | Iwase et al. ................. 370/231 |

FOREIGN PATENT DOCUMENTS

| | | |
|---|---|---|
| DE | 38 14 015 A1 | 11/1989 |
| EP | 0 596 624 A2 | 10/1992 |
| WO | WO 94/29987 | 12/1994 |

OTHER PUBLICATIONS

Priority Assignment Control of ATM Line Buffers with Multiple QOS Classes, Yasushi Takagi, Shigeki Hino, and Tatsuro Takahashi, *IEEE Journal on Selected Areas in Communications, vol. 9, No. 7, Sep. 1991.*

Traffic Control for an ATM Switch with Per VC Queuing: Concept and Implementation, Uwe Briem, Eugen Wallmeier, Christoph Beck, Fred Matthiesen, Siemens AG, Munich–Germany, *XVI World Telecom Congress Proceedings, Sep. 1997.*

ATM & ATM Management, Sellin, pp. 282–285.

International Journal of Digital and Analog Communication Systems, vol. 6, 55–62 (1993).

* cited by examiner

*Primary Examiner*—Chau Nguyen
*Assistant Examiner*—Andy Lee
(74) *Attorney, Agent, or Firm*—Bell, Boyd & Lloyd LLC

(57) ABSTRACT

A method for controlling accesses to resources of a communication network wherein at least two criteria are selected from the transmission-oriented and switching-oriented properties of resources of a communication network and time-division multiplex-oriented sub-resources are allocated with at least one criterion to network termination units arranged in the communication network. A waiting list is provided for each criterion wherein access requests to the sub-resources are allocated dependent on the selected criteria of the corresponding waiting list. The access to the corresponding sub-resources is granted by cyclical processing of the waiting lists wherein advantageously prioritized data streams are handled.

8 Claims, 1 Drawing Sheet

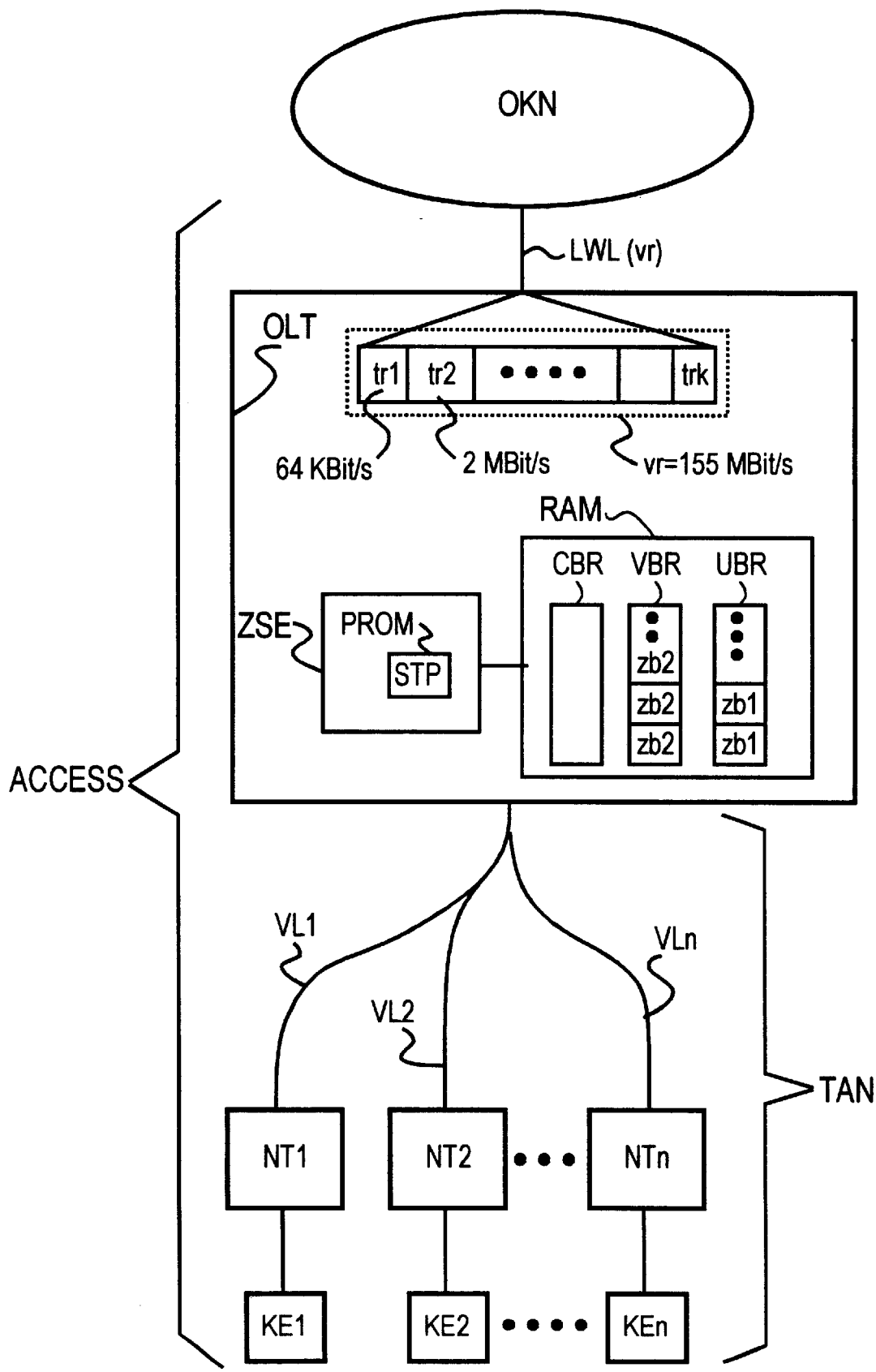

METHOD FOR CONTROLLING ACCESSES TO RESOURCES OF A COMMUNICATION NETWORK

BACKGROUND OF THE INVENTION

1. Field of the Invention

The present invention relates, generally, to a method for controlling accesses to resources of a communication network and, more particularly, to a method of expanding time-division multiplex oriented communication networks, particularly time-division multiplex oriented subscriber access networks, for the utilization of current traffic types or services.

2. Description of the Prior Art

In current communication networks designed according to the asynchronous transfer mode (ATM), particularly in subscriber line networks or subscriber access networks such as those designed as passive optical networks (PON) or as fiber coax networks (also referred to as access networks), the available data transmission rate, or the available resources of the communication network, are divided into network termination units. Such units are connected to either the communication network or the communication terminal equipment connected to the network termination units.

The access of the network termination units, or of the communication terminal equipment to the transmission medium used in common (for example, light waveguide or radio channel), is controlled by an algorithm. Such algorithm is typically realized with hardware given the high transmission rates and given a plurality of connected terminal equipment—a network termination unit requesting a communication network resource being therewith granted the access authorization, or access to the transmission medium used in common. For example, the publication "NOVEL ALGORITHM FOR TIME DIVISION MULTIPLE ACCESS IN BROADBAND ISDN PASSIVE NETWORKS," International Journal of Digital and Analog Communication Systems, Vol. 6, pages 55–62 (1993), M. Glade and H. Keller describes a method for controlling accesses of network termination units to, predetermied resources of a subscriber line network configured as a passive optical communication network.

According to the disclosed method, a timer or counter for each network termination unit, that is started in the framework connection setups derived from the network termination units, is arranged in a network control unit that is centrally arranged in the subscriber line network and connected to each network termination unit. A timer runs down, or the counter reaches a predetermined value, as soon as a new data packet or a specifically reserved memory area is filled with payload data in an affected network termination unit. Such is intermediately stored for data transmission in a buffer memory likewise arranged in the network termination unit. The dimensioning of the counters arranged in the network control unit, or the dimensioning of the time until the expiration of a timer, occurs dependent on the data transmission rates respectively defined, or reserved, during the connection setups. A signalling signal indicating the expiration of a timer represents a network termination unit-associated request for a transmission authorization, or an access to the transmission medium used in common that is sequentially stored in a memory (for example, FTO memory), realized in the network control unit and used in common by all network termination units connected to the network control unit. The stored access requests are read out therefrom and communicated to the connected network termination units, or communication terminal equipment as transmission authorization. As a result, the access to the transmission medium used in common is granted. In the described method, for example, two timers can expire at the same time; i.e., two isochronic access demands would have to be stored and controlled. Since, however, two accesses at the same time are not possible, one of the two access requests is delayed until the current access of the other access request has been terminated. This delay is referred to as a "cell delay variation." Given expiration of a plurality of timers at the same time, the value of the "cell delay variation" is correspondingly incremented.

It has likewise already been proposed that the access authorizations to the transmission medium used in common requested by the network termination units be directly acquired and stored by a central control Unit Thus, the requested accesss to the transmission medium used in common would be uniformly distributed.

A plurality of traffic types, or service offerings defined by the ATM Porum, are also known from the communication technology according to the asynchronous transfer mode (ATM). According to such technology, high bit rate data transmissions with various demands of, for example, bandwidth and delays are supported or offered by the traffic type; see "ATM & ATM-Management: die Basis für das B-ISDN der Zukunft; LAN-Kopplung über ATM WAN", Rüidiger Selling, Berlin, Offenbbach: VDE-Verlag, 1997, pages 282–284. For example, voice, images and data can be transmitted over the same terminals via a type of cell multiplex method. The quality of service (QoS) of the individual traffic types and some traffic parameters are negotiated before the connection setup in the framework of the CAC (connection admission control) and are defined in what is referred to as a traffic agreement. The following traffic types, or service offerings, are defined by the ATM Forum:

constant bit rate (CBR),
variable bit rate (VBR),
unspecified bit rate (UBR),
available bit rate (AR).

The traffic types CBR and VBR are particularly suited for applications with high QoS demands such as, for example, multimedia service or video conference circuits with qualitatively high-grade image transmission. In CBR and VBR services, the bandwidth represents an important traffic parameter that is characterize by the specification of a peak cell rate and that must be offered during the entire duration of the connection.

In the traffic type VBR, the further traffic parameters of "maximum throughput rate" and "maximum cell transmission rate" (in cells per second) are also taken into consideration in the connection set up, in addition to the peak cell rate. The maximum throughput rate limits the transmission duration of an ATM cell to the peak cell rate.

The traffic type UBR is a service wherein, by contrast to CBR and VBR, no fixed bandwidth is reserved and a cell loss rate also is not defined. The network, thus, need not offer any resources for a UBR connection that is to be set up, or that is requested.

The traffic type ABR represents a mixture of reserved bandwidth such as in CBR and VBR, and non-reserved bandwidth as in UBR.

SUMMARY OF THE INVENTION

The present invention is therefore directed toward expanding time-division multiplex oriented communication networks, particularly time-division multiplex oriented subscriber access networks for the utilization of current traffic types or services; for example, for utilization of multimedia applications.

In the inventive method for controlling access to resources of a communication network, at least two criteria are selected from the transmission-oriented and switching-oriented properties of the resources of the communication network. Time-division multiplex oriented sub-resources with at least one criterion are allocated to network termination units arranged in the communication network. An important aspect of the inventive method is that a waiting list is provided for each selected criterion, and access requests of the network termination units to the sub-resources are allocated dependent on the selected criteria of the corresponding waiting list with the corresponding waiting list-individual criterion. By cyclically processing the waiting lists, the access to the corresponding sub-resources is granted according to the allocated access requests.

A critical advantage of the inventive method lies in that current, particularly broadband-oriented data services, such as time-critical multimedia services, can be realized in existing communication networks or communication networks to be installed and, in particular, in the subscriber access networks, also referred to as "access networks," arranged therein. Waiting lists can be cost-beneficially realized by definable memory areas in a memory arranged in the communication network. As such, corresponding memory areas can be defined for an arbitrary plurality of criteria, wherein access requests of network termination units to sub-resources of the communication network are storable therein. Dependent on the memory area-individual criteria, the access requests stored in the individual memory areas are read out and the access to the transmission medium used in common is correspondingly granted to the respective network termination units. Advantageously, data services based on different traffic types (i.e., making use of different transmission rates and processing priorities), can be cost-beneficially realized and offered by the inventive method with the assistance of a transmission medium used in common by a plurality of network termination units. Modern information services such as, for example, video-on-demand enjoy a rapid spread and a high user acceptance due to the advantageous realization of different broadband-oriented data services in subscriber access networks and due to the cost-optimum integration connected therewith.

According to an advantageous development, one criterion represents the priority of information to be communicated with the assistance of the resources; for example, time-critical voice or video services with high priority or data transmission services exhibiting a low priority. A waiting list to which the access requests to the sub-resources are allocated dependent on the priority of the information to be communicated is provided for each criterion. By reading out the access requests from the individual waiting lists, the access to the sub-resources is granted to the network termination units dependent on the allocated, priority-specific access requests. In a further embodiment, the waiting lists with the highest priority are processed first.

For example, the priority is determined with the assistance of the transmissionoriented and switching-oriented properties of the resources of services or services classes to be realized. Given realization of the communication network by a communication network according to the asynchronous transfer mode, the priority is advantageously determined by the properties of traffic types or service offerings defined according to the ATM Forum. As a result of this advantageous realization, information or data services with the following traffic types or service offerings already defined by the ATM Forum can be realized:

constant bit rate (CBR), variable bit rate (VBR), unspecified bit rate (UBR), available bit rate (ABR).

Additional features and advantages of the present invention are described in, and will be apparent from, the Detailed Description of the Preferred Embodiments and the Description of the Drawings.

DESCRIPTION OF THE DRAWINGS

FIG. 1 shows a block circuit diagram of a method for controlling accesses of network termination units to resources of a communication network in accordance with the teachings of the present invention.

DETAILED DESCRIPTION OF THE PREFERRED EMBODIMENTS

The block circuit diagram of FIG. 1 shows a network control unit OLT that is connected to a higher-ranking communication network OKN via predetermined resources vr. In this exemplary embodiment, the higher-ranking communication network OKN is a communication network designed according to the asynchronous transfer mode (ATM). The predetermined resources vr consist of, for example, a light waveguide transmission with a data transmission rate of 155 Mbit/s, wherein the network control unit OLT, for example, is connected to the ATM-designed communication network OKN via a single light waveguide LWL. A plurality of network termination units NT1 . . . n are connected to the network control unit OLT via subscriber lines VL1 . . . n, thus forming a subscriber line network TAN. The subscriber line network TAN represents a transmission medium used in common by all network termination units NT1 . . . n that is fashioned in this exemplary embodiment as a passive optical network (PON), based on a light waveguide as transmission medium. The network control unit OLT and the subscriber line network TAN form the subscriber access network ACCESS for the ATM-oriented, higher-ranking communication network OKN.

Each network termination unit NT1 . . . n is connectable to at least one communication terminal equipment KE, wherein a first communication terminal equipment KE1 is connected to the first network termination unit NT1 and a second communication terminal equipment KE2 is connected to the second network termination unit NT2. The first communication terminal equipment KE1 represents, for example, a personal computer on which a process is active, and via which packet-oriented payload data are to be communicated from the first communication terminal equipment KE1 to the higher-ranking, ATM-oriented communication network OKN. To that end, a corresponding connection setup message is communicated from the first communication terminal equipment KE1 to the first network termination unit NT1 according to packet-oriented connection protocols; for example, according to the Internet-oriented TCP/IP protocols. A protocol-conforming connection setup to the network control unit OLT and, thus, to the higher-ranking, ATM-oriented communication network OKN is initiated by the first network termination unit NT1.

In the framework of the connection setup, for example, a transmission resource tr1, or a bidirectional connection for the realization of a connectionless data transfer given variable bit rates, is allocated for the first communication terminal equipment KE1 which is, in turn, allocated to the first network termination unit NT1. This corresponds to the AAL service class D or the traffic type UBR classified by the ATM Forum that is utilized given unprotected data transfer; for example, Internet protocols such as IP via ATM or LAN-to-LAN couplings via ATM-WAN as communication backbone. In this exemplary embodiment, for example, the transport of the IP data packets occurs via the subscriber line network TAN with a medium data transmission rate of 64 Kbit/s.

Further, the second communication terminal equipment KE2 connected to the second network termination unit NT2 represents, for example, a multimedia communication terminal equipment such as a set top box or a personal computer with active process for processing video and/or audio data. For the transmission of time-critical video and/or audio data, the second communication terminal equipment KE2 communicates a further connection setup request to the network control unit OLT. In the framework of the connection setup, a transmission resource tr2 or, respectively, a bidirectional connection for the realization of services with synchronous data transmission given variable bit rates, is allocated to the second communication terminal equipment KE2. This corresponds to the AAL service class B or, respectively, to the traffic type VBR classified by the ATM Forum that is utilized for the transmission of moving pictures with high image quality such as, for example, in multimedia services or in interactive services such as "video-on-demand," interactive learning, and communicating patient documents including high-resolution X-ray pictures. In this exemplary embodiment, the second network termination unit NT2 has a transmission resource of 2 Mbit/s allocated to it.

An access control unit ZSE that controls the accesses of the network termination units NT1 . . . n to the subscriber access network ACCESS or, respectively, to the time-division multiplex oriented subscriber line network TAN, is arranged in the network control unit OLT, said access control unit ZSE being connected to a volatile memory RAM. The packet-oriented data communicated from the first communication terminal equipment KE1 to the first network termination unit NT1, as well as the packet-oriented data communicated to the second network termination unit NT2, time-critical audio and/or video data, are respectively intermediately stored in a buffer memory (not shown) arranged in the network termination unit NT1 . . . n. In order to assure a data transmission according to the transmission rates or service classes declared according to the protocol (for example, real-time-conforming transmission of the time-critical audio and/or video data from the second network termination unit NT2 to the higher-ranking communication network OKN), as well as in order to prevent an overflow of the buffer memories arranged in the network termination units NT1 . . . n, the access control unit ZSE arranged in the network control unit OLT must allocate accesses to the network termination units NT1 . . . n at regular time intervals according to the access to the predetermined resources vr of the subscriber access network ACCESS or, respectively, of the subscriber line network TAN used in common by all network termination units NT1 . . . n. Such must be done in order to enable a communication of the data stored in the buffer memories of the network termination units NT1 . . . n to the network control unit OLT as well as via the light waveguide LWL to the higher-ranking, ATM-oriented communication network OKN.

Pursuant to the inventive method for controlling the accesses to the time-division multiplex oriented subscriber line network or, respectively, for controlling accesses to the predetermined resources vr of the light waveguide LWL, three memory areas CBR, VBR, UBR are defined or reserved in the memory RAM arranged in the network control unit OLT. The three memory areas CBR, VBR, UBR represent respective waiting lists in which the access requests of the individual network termination units NT1 . . . n are stored dependent on the transmission-oriented and switching-oriented properties (for example, service class or traffic type) of the connections or transmission resources allocated to the individual network termination units NT1 . . . n. Access requests of network termination units NT1 . . . n that control connections according to the traffic type "constant bit rate" defined by the ATM Forum, or services according to the defined service class A, are stored in the first waiting list CBR. Correspondingly, access requests of the traffic type "variable bit rate," or of service class B, are stored in the second waiting list VBR and access requests of the traffic type "unspecified bit rate," or of service class D, are stored in the third waiting list. As such, according to the allocated traffic type properties, the first waiting list CBR exhibits the highest priority, the second waiting list VBR exhibits the second highest priority and the third waiting list exhibits the lowest priority. The access requests are formed by known processes such as those described in the introduction; for example, generating signalling signals with timers or counters with specific count values. For example, access authorizations zb1, zb2 are generated in the network control unit OLT by timers (not shown) for the first and second network control unit NT1, NT2 when a respective payload data volume of 48 bytes or a multiple thereof, has been communicated to the buffer memories of the first and second network termination unit NT1,2 from the first or, respectively, second communication terminal equipment, and are inserted into an ATM cell as payload data. In the framework of the 64 Kbit/s connection controlled by the first network termination unit NT1, for example, a finished ATM cell (i.e., with a payload data volume of 48 bytes) is stored in the buffer memory of the first network termination unit NT1 every 6 ms and an access request zb1 is correspondingly formed every 6 ms in the network control unit OT. The access request zb1 is stored in the third waiting list UBR according to the traffic type of the connection—"unspecified bit rate."

Within the framework of the 2 Mbit/s connection controlled by the second network termination unit NT2, an access request zb2 is formed every 187.5 $\mu$s and stored in the second waiting list VBR according to the traffic type "variable bit rate." For controlling the accesses requested by the network termination units NT1,2, the three waiting lists CBR, VBR, UBR are processed by the access control unit ZSE arranged in the network control unit. Accordingly, the waiting list with the highest priority, the first waiting list CBR, is read out first. The waiting list with the second highest priority, the second waiting list VBR, is subsequently read out. The waiting list with the lowest priority, the third waiting list UBE, is read out thereafter. Since no access requests are stored in the first waiting list CBR according to the exemplary embodiment, the access requests zb2 stored in the second waiting list VBR with the second highest priority are read out and, thus, the access to the transmission medium for a defined transmission time span is allocated to the second network termination unit NT2 or, respectively, to the second communication terminal equipment KE2 within the time delay tolerances that are defined by the allocated service class and guaranteed. After readout of the second waiting list VBR, the access requests zb1 stored in the third waiting list VBR with the lowest priority are read out, and the access to the transmission medium is allocated to the first network termination unit NT1 or, respectively, the first communication terminal equipment KE1 according to the allocated service class. Within the transmission time span allocated to the first communication terminal equipment KE1, the data stored in the buffer memory of the first network termination unit NT1 or, respectively, ATM cells are communicated to the network control unit OLT and in turn, communicated from the OLT to the higher-ranking communication network OKN via the light waveguide LWL.

During the processing of the third waiting list UBR, further access requests zb2 for the control of the resource, or bidirectional connection of traffic type VBR allocated to the second network termination unit NT2, can, for example, be generated in the network control unit wherein they are correspondingly stored in the second waiting list VBR. Due to the allocated, higher priority, the second waiting list VBR is processed for execution of the more highly prioritized traffic controlled by the second network termination unit NT2.

The disclosed method realizes a time slot allocation method that advantageously unites the division into traffic classes or, respectively, traffic types applied in current broadband technology. That is, the most important data traffic displaces the less important, with the strategy of the shared waiting list for reservations of accesses to a transmission medium used in common.

Although the present invention has been described with reference to specific embodiments, those of skill in the art will recognize that changes may be made thereto without departing from the spirit and scope of the invention as set forth in the hereafter appended claims.

I claim as my invention:

1. A method for controlling accesses to resources of a communication network, wherein the communication network includes a plurality of network termination units, and the resources of the communication network are attributed with transmission-oriented and switching-oriented properties, the method comprising the steps of:

selecting at least two criteria from the transmission-oriented and switching-oriented properties;

allocating time-division multiplex-oriented sub-resources with at least one criterion to the network termination units;

providing a waiting list for each of the selected criterion to which is associated waiting list-individual criterion;

allocating access requests with selected criteria, of the network termination units to the sub-resources, to the respective waiting lists with the respectively associated waiting list-individual criteria; and granting access to the sub-resources according to the allocated access requests by cyclical processing of the waiting lists.

2. A method for controlling accesses to resources of a communication network as claimed in claim 1, further comprising the steps of:

sequencing the cyclical processing of the waiting lists according to the waiting list-individual criteria; and removing the corresponding access request from the respective waiting list after access to the corresponding sub-resource is granted.

3. A method for controlling accesses to resources of a communication network as claimed in claim 1, further comprising the steps of:

defining a criterion as representing a priority of information to be communicated with the assistance of the resources, wherein a waiting list is provided for each priority and the access requests are allocated dependent on the priority; and granting the access to the sub-resources dependent on the allocated, priority-specific access requests.

4. A method for controlling accesses to resources of a communication network as claimed in claim 3, wherein the waiting lists with the highest priority are processed first.

5. A method for controlling accesses to resources of a communication network as claimed in claim 3, further comprising the step of:

defining the priority by services to be performed with the assistance of the transmission-oriented and switching-oriented properties of the resources of the communication network.

6. A method for controlling accesses to resources of a communication network as claimed in claim 1, wherein the communication network is designed according to the asynchronous transfer mode.

7. A method for controlling accesses to resources of a communication network as claimed in claim 6, further comprising the step of:

defining the priority by service offerings of a specific service quality defined according to the asynchronous transfer mode Forum.

8. A method for controlling accesses to resources of a communication network as claimed in claim 1, further comprising the step of:

representing the time division multiplex-oriented sub-resources of the communication network by one of transmission channels and virtual transmission channels with allocated transmission rate.

* * * * *